(12) United States Patent
Miller et al.

(10) Patent No.: US 8,791,198 B2
(45) Date of Patent: Jul. 29, 2014

(54) CURABLE AQUEOUS COMPOSITION

(75) Inventors: Wayne P. Miller, Mounds View, MN (US); Patrick D. Gleason, Shoreview, MN (US); Michael Wright, St. Michael, MN (US)

(73) Assignee: H.B. Fuller Company, St. Paul, MN (US)

( * ) Notice: Subject to any disclaimer, the term of this patent is extended or adjusted under 35 U.S.C. 154(b) by 0 days.

(21) Appl. No.: 13/460,367

(22) Filed: Apr. 30, 2012

(65) Prior Publication Data

US 2013/0289171 A1    Oct. 31, 2013

(51) Int. Cl.
*C08L 31/00* (2006.01)
*C08L 33/02* (2006.01)
*C08L 31/04* (2006.01)
*C08L 23/08* (2006.01)

(52) U.S. Cl.
CPC ............... *C08L 33/02* (2013.01); *C08L 31/04* (2013.01); *C08L 23/0869* (2013.01)
USPC ............. 524/556; 524/44; 524/503; 524/524

(58) Field of Classification Search
CPC ...... C08L 33/02; C08L 31/04; C08L 23/0869
USPC .................................... 524/44, 503, 524, 556
See application file for complete search history.

(56) References Cited

U.S. PATENT DOCUMENTS

| | | | |
|---|---|---|---|
| 2,789,099 A | 4/1957 | Howard et al. | |
| 3,116,270 A | 12/1963 | Pennino | |
| 3,387,061 A | 6/1968 | Smith et al. | |
| 3,647,507 A * | 3/1972 | Ashcraft | 427/288 |
| 3,669,942 A | 6/1972 | Van Westrenen et al. | |
| 3,755,282 A | 8/1973 | Wright | |
| 3,769,248 A * | 10/1973 | Kovats | 524/734 |
| 3,950,398 A | 4/1976 | Klein | |
| 4,077,926 A | 3/1978 | Sanderson et al. | |
| 4,079,025 A | 3/1978 | Young et al. | |
| 4,157,994 A | 6/1979 | Totty et al. | |
| 4,331,438 A | 5/1982 | Pai | |
| 4,375,535 A | 3/1983 | Kightlinger et al. | |
| 4,396,680 A | 8/1983 | Chang | |
| 4,435,556 A | 3/1984 | Masler, III | |
| 4,534,866 A | 8/1985 | Becker | |
| 4,621,127 A | 11/1986 | Denzinger et al. | |
| 4,743,664 A | 5/1988 | Matui et al. | |
| 4,845,152 A | 7/1989 | Palmer | |
| 4,861,539 A | 8/1989 | Allen et al. | |
| 4,936,865 A | 6/1990 | Welch et al. | |
| 4,980,433 A | 12/1990 | Chen et al. | |
| 4,992,519 A | 2/1991 | Mukherjee | |
| 5,026,746 A | 6/1991 | Floyd et al. | |
| 5,028,655 A | 7/1991 | Stack | |
| 5,073,612 A | 12/1991 | Irie et al. | |
| 5,077,361 A | 12/1991 | Hughes et al. | |
| 5,116,890 A | 5/1992 | Floyd et al. | |
| 5,137,963 A | 8/1992 | Stack | |
| 5,143,582 A | 9/1992 | Arkens et al. | |
| 5,147,956 A | 9/1992 | Allen | |
| 5,179,173 A | 1/1993 | Fong et al. | |
| 5,185,413 A | 2/1993 | Yoshinaga et al. | |
| 5,190,996 A | 3/1993 | Foran et al. | |
| 5,216,099 A | 6/1993 | Hughes et al. | |
| 5,219,969 A | 6/1993 | Uhl et al. | |
| 5,256,746 A | 10/1993 | Blankenship et al. | |
| 5,280,079 A | 1/1994 | Allen et al. | |
| 5,294,686 A | 3/1994 | Fiarman et al. | |
| 5,314,943 A | 5/1994 | Steinwand | |
| 5,318,990 A | 6/1994 | Strauss | |
| 5,340,868 A | 8/1994 | Strauss et al. | |
| 5,345,803 A | 9/1994 | Cutter | |
| 5,376,731 A | 12/1994 | Kerr et al. | |
| 5,409,571 A | 4/1995 | Togo et al. | |
| 5,410,004 A | 4/1995 | Williams | |
| 5,412,026 A | 5/1995 | Holy et al. | |
| 5,427,587 A | 6/1995 | Arkens et al. | |
| 5,498,658 A | 3/1996 | Pourahmady et al. | |
| 5,520,997 A | 5/1996 | Pourahmady et al. | |
| 5,536,766 A | 7/1996 | Seyffer et al. | |

(Continued)

FOREIGN PATENT DOCUMENTS

| | | |
|---|---|---|
| DE | 19949591 | 4/2001 |
| EP | 0 355 043 | 2/1990 |

(Continued)

OTHER PUBLICATIONS

Kumeta, K., et al., "Crosslinking reaction of poly(vinyl alcohol) with poly(acrylic acid) by heat treatment: Effect of neutralization of PAA," Journal of Applied Polymer Science, 2003, 90, 2420-2427.*
Compton, R. G., et al., "Ester formation and hydrolysis and related reactions," in Comprehensive Chemical Kinetics, 1972, Elsevier, p. 155.*
Stepan-MILD BSB, Product Bulletin, 2013.*
Sodium 2-{2-[2-(tridecyloxy)ethoxy]ethoxy}ethyl sulfate, compound summary showing structure of sodium trideceth sulfate, downloaded from PubChem on Apr. 8, 2013.*
Guo, X. Q., et al., "Studies on the kinetic and initiation mechanism of acrylamide polymerization using persulfate/aliphatic diamine systems as initiator," Makromol. Chem., 1990, 191, 577-587.*
Rhodapex EST-30/BLB, product datasheet, 2007.*
Noveon Technical Data Sheet 237, "Neutralizing Carbopol and Pemulen Polymers in Aqueous and Hydroalcoholic Systems," 2002.*
Lubrizol, "Thickening Properties," Pharmaceutical Bulletin 6, 2011.*
Flexbond 381, technical data sheet, 2009.*
Myasnikova, L. P., "Transitions and Relaxations," Kirk-Othmer Encyclopedia of Industrial Chemistry, Published online 2010.*
Robert D. Athey Jr., Emulsion Polymer Technology. 1991; p. 195, Marcel Dekker Inc. New York.

*Primary Examiner* — Mark Eashoo
*Assistant Examiner* — Nicholas Hill
(74) *Attorney, Agent, or Firm* — Kirsten Stone; Allison Johnson

(57) ABSTRACT

A curable aqueous composition that includes a first polymer that includes carboxyl groups, and a second component that includes a second water insoluble polymer and a stabilizer. The second component includes functional groups that react with the carboxyl groups of the first polymer during cure, is free from carboxylic acid groups, or a combination thereof. The composition, when dry, exhibits a first Tg of at least 10° C. and a second Tg of at least 50° C.

32 Claims, No Drawings

(56) References Cited

U.S. PATENT DOCUMENTS

| | | |
|---|---|---|
| 5,549,852 A | 8/1996 | Bell |
| 5,578,371 A | 11/1996 | Taylor et al. |
| 5,604,291 A | 2/1997 | Kerr et al. |
| 5,661,213 A | 8/1997 | Arkens et al. |
| 5,667,848 A | 9/1997 | Wuestefeld et al. |
| 5,670,585 A | 9/1997 | Taylor et al. |
| 5,691,426 A | 11/1997 | Floyd |
| 5,691,432 A | 11/1997 | Williams |
| 5,693,707 A | 12/1997 | Cheng et al. |
| 5,705,475 A | 1/1998 | Tang et al. |
| 5,718,728 A | 2/1998 | Arkens et al. |
| 5,728,771 A | 3/1998 | Tang et al. |
| 5,753,746 A | 5/1998 | Rupaner et al. |
| 5,763,524 A | 6/1998 | Arkens et al. |
| 5,840,822 A | 11/1998 | Lee et al. |
| 5,858,549 A | 1/1999 | Kielbania, Jr. et al. |
| 5,866,664 A | 2/1999 | McCallum, III et al. |
| 5,891,972 A | 4/1999 | Egraz et al. |
| 5,919,716 A | 7/1999 | Raynolds et al. |
| 5,932,665 A | 8/1999 | DePorter et al. |
| 5,977,232 A | 11/1999 | Arkens et al. |
| 5,993,530 A | 11/1999 | Tanaka et al. |
| 6,051,646 A | 4/2000 | Nass et al. |
| 6,063,498 A | 5/2000 | Licht et al. |
| 6,063,884 A | 5/2000 | Egraz et al. |
| 6,071,434 A | 6/2000 | Davis et al. |
| 6,071,994 A | 6/2000 | Hummerich et al. |
| 6,099,773 A | 8/2000 | Reck et al. |
| 6,103,789 A | 8/2000 | Marciandi et al. |
| 6,114,464 A | 9/2000 | Reck et al. |
| 6,136,916 A | 10/2000 | Arkens et al. |
| 6,146,746 A | 11/2000 | Reck et al. |
| 6,171,654 B1 | 1/2001 | Salsman et al. |
| 6,184,321 B1 | 2/2001 | Egraz et al. |
| 6,194,512 B1 | 2/2001 | Chen et al. |
| 6,221,973 B1 | 4/2001 | Arkens et al. |
| 6,241,780 B1 | 6/2001 | Arkens et al. |
| 6,262,159 B1 | 7/2001 | Dreher et al. |
| 6,274,661 B1 | 8/2001 | Chen et al. |
| 6,296,795 B1 | 10/2001 | Buck |
| 6,297,336 B1 | 10/2001 | Shioji et al. |
| 6,299,936 B1 | 10/2001 | Reck et al. |
| 6,309,565 B1 | 10/2001 | Stowell et al. |
| 6,331,350 B1 | 12/2001 | Taylor et al. |
| 6,335,406 B1 | 1/2002 | Nagasuna et al. |
| 6,348,530 B1 | 2/2002 | Reck et al. |
| 6,380,353 B1 | 4/2002 | Rupaner et al. |
| 6,395,813 B1 | 5/2002 | Duccini et al. |
| 6,399,694 B1 | 6/2002 | McGrath et al. |
| 6,410,647 B1 | 6/2002 | Yoshioka et al. |
| 6,444,750 B1 | 9/2002 | Touhsaent |
| 6,472,478 B1 | 10/2002 | Funk et al. |
| 6,489,287 B1 | 12/2002 | Gauthier et al. |
| 6,582,476 B1 | 6/2003 | Binder et al. |
| 6,585,780 B2 | 7/2003 | Koola et al. |
| 6,585,933 B1 | 7/2003 | Ehrhardt et al. |
| 6,596,386 B1 | 7/2003 | Reck et al. |
| 6,599,997 B2 | 7/2003 | Araki et al. |
| 6,699,945 B1 | 3/2004 | Chen et al. |
| 6,730,729 B2 | 5/2004 | Gerst et al. |
| 6,753,361 B2 | 6/2004 | Kroner et al. |
| 6,780,903 B2 | 8/2004 | Peltonen et al. |
| 6,835,767 B2 | 12/2004 | Kuhl et al. |
| 6,884,849 B2 | 4/2005 | Chen et al. |
| 6,906,132 B2 | 6/2005 | Belmares et al. |
| 6,984,675 B2 | 1/2006 | Lesley et al. |
| 7,141,626 B2 | 11/2006 | Rodrigues et al. |
| 7,199,179 B2 | 4/2007 | Clamen et al. |
| 7,384,881 B2 | 6/2008 | Miller et al. |
| 7,413,801 B2 | 8/2008 | Miller et al. |
| 7,854,980 B2 | 12/2010 | Jackson et al. |
| 7,863,373 B1 | 1/2011 | Miller et al. |
| 2002/0091185 A1 | 7/2002 | Taylor et al. |
| 2002/0130439 A1 | 9/2002 | Kroner et al. |
| 2004/0033747 A1 | 2/2004 | Miller et al. |
| 2004/0082240 A1 | 4/2004 | Rodrigues et al. |
| 2004/0082726 A1 | 4/2004 | Rodrigues et al. |
| 2004/0115429 A1 | 6/2004 | Michl et al. |
| 2006/0121810 A1 | 6/2006 | Rodrigues |
| 2006/0160974 A1* | 7/2006 | Schulte et al. ............... 526/330 |
| 2006/0205852 A1 | 9/2006 | Tang et al. |
| 2006/0264539 A1 | 11/2006 | Mosseveld et al. |
| 2007/0049663 A1* | 3/2007 | Cordova ...................... 524/52 |
| 2008/0083522 A1 | 4/2008 | Poggi et al. |
| 2009/0124151 A1 | 5/2009 | Shoemake |
| 2009/0312481 A1* | 12/2009 | Jakob et al. ................. 524/503 |
| 2010/0098947 A1* | 4/2010 | Inoue et al. ................. 428/375 |

FOREIGN PATENT DOCUMENTS

| | | |
|---|---|---|
| EP | 0397410 | 11/1990 |
| EP | 651088 A1 | 5/1995 |
| EP | 583086 B1 | 11/1997 |
| EP | 964026 A1 | 12/1999 |
| EP | 990729 A1 | 4/2000 |
| EP | 1039348 A2 * | 9/2000 |
| EP | 1700883 A1 | 9/2006 |
| EP | 1 978 058 | 10/2008 |
| GB | 2 078 805 | 1/1982 |
| SU | 564 325 | 7/1997 |
| WO | WO 94/1112 | 5/1996 |
| WO | WO 99/10398 | 3/1999 |
| WO | WO 99/64505 | 12/1999 |
| WO | WO 2004/050978 A1 | 6/2004 |
| WO | WO 2006/063802 | 6/2006 |
| WO | WO 2011/019593 A1 | 2/2011 |

* cited by examiner

US 8,791,198 B2

CURABLE AQUEOUS COMPOSITION

BACKGROUND

The invention relates to aqueous binder compositions that include an emulsion polymer.

Formaldehyde-free fiber glass binder compositions are typically solutions prepared from water soluble polymers and additives. In the past, emulsions have not been used to form fiber glass binder compositions, because it was believed that they would cause poor sprayability, poor atomization of spray, and poor flow onto the fiberglass, which would lead to poor binder uniformity and poor composite performance.

Emulsion polymers have lower viscosities than their solution polymer counterparts. This lower viscosity allows for higher polymer concentrations to be delivered in a relatively low viscosity composition.

There is a need for a fiber glass binder composition that exhibits good sprayability, cures to a hardened state and exhibits good humidity resistance.

SUMMARY

In one aspect, the invention features an aqueous composition that includes a first polymer that includes carboxyl groups, and a component (e.g., an emulsion) that includes a water insoluble polymer and a stabilizer, at least one of the water insoluble polymer and the stabilizer comprising functional groups that react with the carboxyl groups of the first polymer during cure, the binder composition, when dry, exhibiting a first Tg of at least 10° C. and a second Tg of at least 50° C.

In one embodiment, the ratio of the weight of the water insoluble and stabilizer to the weight of the first polymer is from about 99:1 to about 30:70. In other embodiments, the ratio of the weight of the water insoluble and stabilizer to the weight of the first polymer is from about 85:15 to about 45:55.

In some embodiments, the cured binder composition exhibits a hardness of at least 6. In other embodiments, the cured binder composition exhibits a hardness of at least 7. In other embodiments, the cured binder composition exhibits a hardness of at least 8.

In another embodiment, the first polymer includes a carboxy functional, hydroxyl functional polymer.

In other embodiments, the second polymer is derived from ethylenically unsaturated monomer. In some embodiments, the second polymer includes at least one of polyvinyl acetate and vinyl acetate copolymer.

In another embodiment, the stabilizer includes starch.

In some embodiments, the water insoluble polymer is derived from at least one of vinyl acetate, acrylic, styrene, olefin, and acrylamide. In other embodiments, the water insoluble polymer is an emulsion polymer. In other embodiments, the component is an emulsion.

In one embodiment, the stabilizer includes a protective colloid. In another embodiment, the stabilizer includes at least one of starch, hydroxymethyl cellulose, carboxymethyl cellulose, hydroxyethyl cellulose, hydroxypropyl cellulose, polyvinyl alcohol, and surfactant. In other embodiments, the stabilizer includes surfactant and the surfactant includes functional groups that are reactive with the first polymer.

In some embodiments, the water insoluble polymer includes hydroxyl groups.

In other embodiments, the binder composition further includes at least one of a polyol, an alkanolamine, and a silane. In another embodiment, the binder composition further includes at least one of a monoalkanolamine, a dialkanolamine, and a trialkanolamine.

In on embodiment, the binder composition further includes a latent acid catalyst. In some embodiments, the latent acid catalyst includes ammonium nitrate.

In another aspect, the invention features an aqueous binder composition that includes a first polymer that includes carboxyl groups, and a component that includes a water insoluble polymer and a stabilizer, the water insoluble polymer being free of carboxylic acid groups, the binder composition, when dry, exhibiting a first Tg of at least 10° C. and a second Tg of at least 50° C.

In other aspects, the invention features an aqueous binder composition that includes a solution that includes a first polymer that includes carboxyl groups, and an emulsion that includes a second water insoluble polymer derived from vinyl acetate and a stabilizer, at least one of the water insoluble polymer and the stabilizer including a functional group reactive with the carboxyl groups of the first polymer, the binder composition, when dry, exhibiting a first Tg of at least 10° C. and a second Tg of at least 50° C.

In another aspect, the invention features a method of using a binder composition disclosed herein, the method including contacting a substrate with the binder composition. In one embodiment, the substrate includes at least one of fibers and particles.

In other aspects, the invention features a method of making an aqueous binder composition that includes combining a first aqueous composition that includes a first polymer that includes carboxyl groups, and a second aqueous composition that includes an emulsion that includes a second water insoluble polymer and a stabilizer, the second water insoluble polymer having a Tg of at least 10° C. and at least one functional group reactive with the carboxyl group of the first polymer.

In one embodiment, the first aqueous composition is a solution. In another embodiment, the ratio of the weight of the first polymer based on solids to the weight of the solids in the emulsion is from about 10:90 to about 90:10. In other embodiments, the first polymer has Tg of at least 30° C.

The binder composition exhibits good sprayability, which facilitates the uniform deposition of the composition on a variety of substrates.

The binder composition can be used to form fiberglass insulation having good performance properties such as good heat resistance, good loft, good spring back and good spring back after aging in high humidity conditions.

Other features and advantages will be apparent from the following description of the preferred embodiments and from the claims.

Glossary

In reference to the invention, these terms have the meanings set forth below:

The term "starch" means a polysaccharide that is insoluble in cold water and includes linear amylose, helical amylose, and branched amylopectin.

The term "(meth)acrylate" means acrylate and methacrylate.

DETAILED DESCRIPTION

The aqueous binder composition includes a component (e.g., an emulsion) that includes a water insoluble polymer and a stabilizer, and a solution that includes a polymer that includes carboxyl groups. The aqueous binder composition preferably is sprayable such that it exhibits a uniform spray with minimal spitting, stringing, nozzle build-up and nozzle plugging. When dry, the aqueous binder composition preferably has at least two different glass transition temperatures (Tg). When dry, the aqueous binder composition preferably has a first Tg of at least 50° C. and a second Tg of at least 10° C., at least 25° C., at least 30° C., at least 35° C., at least 40° C., no greater than 150° C., no greater than 110° C., no greater than 100° C., from about 30° C. to about 60° C., or even from about 35° C. to about 55° C.

The aqueous binder composition preferably cures to form a binder that is humidity resistant. One measure of humidity resistance is the degree of hardness that the cured composition exhibits after soaking in water. The cured binder composition preferably exhibits a hardness of at least 6, of at least 6.5, at least 7, at least 8, at least 9, or even at least 10, when tested according to the water soak test method.

The emulsion and solution are preferably combined in an amount such that the ratio of the combined weight of the water insoluble polymer and stabilizer in the emulsion to the weight of the polymer in the solution is no greater than about 95:5, no greater than about 90:10, no greater than about 85:15, no greater than about 80:20, from about 90:10 to about 10:90, from about 85:15 to about 15:85, from about 80:20 to about 20:80, from about 70:30 to about 30:70, from about 65:35 to about 35:65, from about 60:40 to about 40:60, or even about 50:50.

The binder composition can exhibit any suitable viscosity and preferably a viscosity suitable for its intended use and application methods. Suitable viscosities include, e.g., no greater than 75,000 cps, no greater than 50,000 cps, no greater than 25,000 cps, no greater than 10,000 cps, no greater than 5,000 cps, no greater than 3,000 cps, no greater than 1,000 cps, no greater than 800 cps, or even no greater than 500 cps at 23° C. The binder composition preferably has a viscosity suitable for application using a sprayer for aqueous-based compositions. When the binder composition is used in spray applications, it preferably exhibits a viscosity of no greater than 1000 cps, no greater than 500 cps, or even no greater than 100 cps at 23° C.

The binder composition can include any suitable amount of solids (i.e., the components remaining after drying one gram of the composition at 130° C. for two hours) including, e.g., from 3% by weight to about 85% by weight, from about 10% by weight to about 80% by weight, from about 20% by weight to about 75% by weight, from about 25% by weight to about 70% by weight, from about 25% by weight to about 65% by weight, or even from about 35% by weight to about 60% by weight solids. The binder composition can be formulated to have a relatively higher solids content, which subsequently can be diluted by the end user to have a relatively lower solids content.

The binder composition also preferably exhibits a pH of no greater than 7, no greater than about 6, no greater than about 5, at least 2, at least 2.5, from about 2 to about 6, from about 3 to about 5, or even about 4.

I. Emulsion

The emulsion of the aqueous binder composition includes a water insoluble polymer (which is also referred to herein as the emulsion polymer) and a stabilizer. At least one component of the emulsion (e.g., the polymer, stabilizer, or a combination thereof) optionally includes at least one group that is capable of reacting with a carboxyl group on the solution polymer during curing. Such functional groups include, e.g., hydroxyl, alkoxy, aryloxy, thiol, epoxy, siloxy, amine, amide, and combinations thereof, as further disclosed below. Alternatively or in addition, the water insoluble polymer and the stabilizer are free of carboxyl groups.

Examples of useful commercially available emulsions include emulsions available under the trade designations PD0330, PD0062, PN3133M, PD0128, PD1202, PD0025, PD0027, PD2227, PN3178Z, PN3741H, PD2121, PD2210, PD2222, PD0458NW modified, PN3610K, and PN3178Z from H.B. Fuller Company (Vadnais Heights, Minn.) and VINNAPAS 440H from Wacker Polymers (Allentown, Pa.)

A. Water Insoluble Polymer

The water insoluble polymer preferably has a glass transition temperature (Tg) of at least 10° C., at least 25° C., at least 30° C., at least 35° C., at least 40° C., no greater than 150° C., no greater than 110° C., no greater than 100° C., from about 30° C. to about 60° C., or even from about 35° C. to about 55° C. The water insoluble polymer optionally is in the form of particles and is sometimes referred to herein as an emulsion polymer. Useful water insoluble polymers include homopolymers, copolymers, and combinations thereof, of ethylenically unsaturated monomers. Examples of suitable water insoluble polymers include polyvinyl acetate, vinyl acetate ethylene copolymer, vinyl acrylic copolymers, (meth) acrylic (co)polymers, vinyl acetate dioctylmaleate copolymer, vinyl acetate dibutylmaleate copolymer, styrene polymers, styrene acrylic copolymers, copolymers made from styrene/acrylic/vinyl acetate, polymers made from the monomers set forth below (including, e.g., functional monomers), and combinations thereof.

Useful emulsion polymers can be derived from a variety of ethylenically unsaturated monomers including, e.g., vinyl esters (e.g., vinyl acetate, vinyl versatate, vinyl formate, vinyl propionate, vinyl isobutyrate, vinyl valerate, vinyl pivalate, vinyl 2-ethylhexanoate, vinyl esters of saturated branched monocarboxylic acids (e.g., vinyl nonoate and vinyl decanoate), vinyl esters of long chain (e.g., from 10 to 20 carbon atoms) saturated and unsaturated, branched and unbranched fatty acids, (e.g., vinyl laurate or vinyl stearate), vinyl esters of benzoic acid, and combinations thereof), vinyl ethers, vinyl halides (e.g., vinyl chloride), vinylidene halides (e.g., vinylidene chloride), alkyl vinyl ketones, N-vinyl carbazole, N-vinyl pyrrolidone, vinyl pyridine (e.g., 2-vinylpyridine and 4-vinylpyridine), ethylenically unsaturated aromatic compounds (e.g., styrene, alkyl styrenes, and chlorostyrene), ethylenically unsaturated acids, ethylenically unsaturated anhydrides, acrylates (e.g., alkyl (meth)acrylates, allyl (meth)acrylates, and hydroxylated alkyl (meth) acrylates), acrylamides, substituted acrylamides, acrylonitrile, methacrylonitrile, olefins, divinyl benzene, vinyl alkoxy silane (e.g., vinyl triethoxy silane), vinyl diethylmethyl silane, vinyl methyl dichlorosilane, triphenyl vinyl silane, 1-vinyl-1-methyl-sila-14-crown-5, C1-C8 alkyl crotonates, di-n-butyl maleate, dioctylmaleate, di-allyl maleate, di-allylmalonate, a-vinyl naphthalene, p-vinyl naphthalene, vinyl ethylene carbonate, epoxy butene, 3,4-dihydroxybutene, butadiene, ethylformamide, N-vinylformamide, N-vinyl-N-methylformamide, N-vinylimidazole, 1-vinyl-2-methylimidazole, 1-vinyl-2-methylimidazoline, N-vinylcaprolactam, allyl alcohol, diallyldimethylammonium chloride, acrolein, methacrolein, vinylcarbazole, 4-vinyl-1,3-dioxolan-2-one, 2,2-dimethyl-4 vinyl-1,3-dioxolane, 3,4-di-acetoxy-1-butane, and combinations thereof.

Examples of useful ethylenically unsaturated acid and ethylenically unsaturated anhydride monomers include acrylic acid, methacrylic acid, crotonic acid, itaconic acid, fumaric acid, and maleic acid, and anhydrides thereof, monovinyl adipate, and combinations thereof.

Examples of useful vinyl ether monomers include methyl, ethyl, propyl, isobutyl, 2-ethylhexyl, cyclohexyl, 4-hydroxybutyl, decyl, dodecyl, octadecyl, 2-(diethylamino)ethyl, 2-(di-n-butylamino)ethyl and methyldiglycol vinyl ether, the corresponding allyl alkyl ethers, and combinations thereof.

Examples of useful acrylate monomers include methyl acrylate, methyl methacrylate, ethyl acrylate, ethyl methacrylate, butyl acrylate, butyl methacrylate, isobutyl acrylate, isobutyl methacrylate, ethylhexyl acrylate, 2-ethylhexyl methacrylate, 2-ethyl hexyl acrylate, octyl acrylate, octyl methacrylate, iso-octyl acrylate, iso-octyl methacrylate, trimethyolpropyl triacrylate, hydroxyethylacrylate, hydroxyethylmethacrylate, hydroxypropylacrylate, hydroxypropylmethacrylate, hydroxybutylacrylate, hydroxybutylmethacrylate, hydroxybutenyl methacrylate, glycidyl methacrylate, acetoacetoxy ethyl methacrylate, acetoacetoxy ethyl acrylate, allyl methacrylates, methyoxybutenyl methacrylate, isobornyl methacrylate, vinyl(meth)acrylates, isopropenyl(meth)acrylate, cycloaliplaaticepoxy (meth)acrylates, carbodiimide methacrylate, and combinations thereof.

Examples of useful acrylamides include acrylamide, methacrylamide, butyl acrylamide, ethyl acrylamide, N-tert-butylacrylamide, N-methyl(meth)acrylamide, and combinations thereof.

Examples of useful olefins include ethylene, propylene, butene, isobutylene, pentene, clyclopentene, hexane, cylcohexene, octane, 1-3 butadiene, chloroprene, cyclobutadiene, isoprene, and combinations thereof.

The mixture used to form the emulsion polymer optionally includes multifunctional ethylenically unsaturated monomers suitable examples of which include, e.g., butanediol divinyl ether, trimethylolpropane trivinyl ether, diallyl phthalate, ethylene glycol di(meth)acrylate, 1,2-propylene glycol di(meth)acrylate, 1,4-butanediol di(meth)acrylate, hexanedioldi(meth)acrylate, neopentyl glycol di(meth)acrylate, 3-methylpentanediol di(meth)acrylate, trimetholpropane tri(meth)acrylate, diacrylates or dimethacrylates of polyethylene glycols and polypropylene glycols having a molecular weight from 200 to 9000, and combinations thereof.

The water insoluble polymer of the emulsion optionally is functionalized (i.e., includes functional groups) with groups capable of reacting with the carboxyl group of the solution polymer during curing. Useful functional groups for incorporation into the emulsion polymer include, e.g., hydroxyl, alkoxy, aryloxy, thiol, epoxy, siloxy, amine, amide, and combinations thereof.

Functional groups can be incorporated into the emulsion polymer as a result of partial hydrolysis, copolymerization, grafting or a combination thereof, of the base polymer (or monomer used to form the polymer) with a comonomer, an oligomer, another polymer, the stabilizer, or a combination thereof. For polymers that are susceptible to hydrolysis (e.g., polyvinyl acetate), partial hydrolysis of the polymer (which can be accelerated by low pH and high cure temperatures) will result in the creation of some hydroxyl groups on the polymer backbone. These hydroxyl groups are then available for reaction with the carboxyl groups of the solution polymer.

One useful method of incorporating functional groups into the emulsion polymer through copolymerization includes polymerizing the emulsion polymer in the presence of monomers having functional groups. Examples of such monomers include 2-hydroxyethyl acrylate, glycidyl methacrylate, acetoacetoxy ethyl methacrylate, glycerol carbonate acrylate, vinyl ethylene carbonate, hydroxyethyl methacrylate, t-butylaminoethyl methacrylate, dimethylamino methacrylate, m-isopropenyl-alpha, alpha-dimethylbenzyl isocyanate, acrylamide, N-methylolacrylamide, N-isobutoxy methylacrylamide, and combinations thereof.

One method of imparting functionality to the polymer through grafting can occur as a result of polymerizing the emulsion polymer in the presence of a stabilizer that includes functional groups (e.g., hydroxyl groups). In this process, at least a portion of the polymer may graft to a stabilizer that includes functional groups. Examples of stabilizers that include functional groups include functional protective colloids (e.g., starch, polyvinyl alcohol, cellulose (e.g., hydroxyethyl cellulose), and combinations thereof), functional surfactants (e.g., the reactive surfactants set forth below), and combinations thereof.

The emulsion preferably includes no greater than about 99% by weight, at least about 20% by weight, at least about 30% by weight, at least about 35% by weight, from about 35% by weight to about 98% by weight, or even from about 40% by weight to about 80% by weight water insoluble polymer based on the weight of solids in the aqueous binder composition.

B. Stabilizer

The stabilizer stabilizes the water insoluble polymer in the emulsion. Useful stabilizers include, e.g., protective colloids (e.g., reactive protective colloid), surfactants (e.g., reactive surfactants), and combinations thereof. The stabilizer optionally includes functional groups capable of reacting with the carboxyl group on the solution polymer. Useful functional groups for incorporation into the stabilizer include, e.g., hydroxyl, alkoxy, aryloxy, thiol, epoxy, siloxy, amine, amide, and combinations thereof.

The emulsion preferably includes no greater than about 20% by weight, at least about 1 by weight, at least about 3% by weight, at least about 5% by weight, from about 10% by weight to about 20% by weight, or even from about 20% by weight to about 30% by weight stabilizer based on the weight of solids in the emulsion.

1. Protective Colloid

Useful classes of protective colloid stabilizers include, e.g., polysaccharides (e.g., starch and starch derivatives), polyvinyl alcohol, polyvinyl alcohol copolymers, cellulose, cellulose derivatives (e.g., hydroxymethyl cellulose, hydroxyethyl cellulose, hydroxypropyl cellulose, carboxymethyl cellulose, carboxyethyl cellulose, and combinations thereof), polyethylene glycol, polypropylene glycol, copolymers of ethylene glycol and propylene glycol, polyvinyl ethers, dextran, polyvinylpyrrolidone, polyvinylpyridine, polyvinylimidazole, polyvinylsuccinimide, polyvinyl-2-methylsuccinimide, and polyvinyl-1,3-oxazolid-2-one, polyvinyl-2-methylimidazoline, sorbitol acrylate, sorbitol methacrylate, and combinations thereof.

Useful polysaccharides include natural starches including, e.g., cornstarch, potato starch, wheat starch, rice starch, tapioca starch, sago starch, sorghum starch, cassava starch, pea starch, and combinations thereof. In addition to the natural starches, hydrolytically and enzymatically degraded starches are also suitable, examples of which include dextrins (e.g., white and yellow dextrins and maltodextrins), oxidized starches dialdehyde starch), chemically modified starches (e.g., starches esterified with organic and inorganic acids (e.g., phosphated and acetylated starches), starches esterified with organic halogen compounds, epoxides, sulfates and combinations thereof, and combinations thereof.

The colloid optionally is polymerizable, i.e., it includes at least one ethylenically unsaturated functional group capable of reacting with other monomers or polymers. The colloid optionally is polymerized with the water insoluble polymer of the emulsion, monomers from which the water insoluble polymer is prepared, or a combination thereof. A polymerizable colloid that is polymerized with a water insoluble polymer is referred to herein as both a polymerizable colloid and a polymerized colloid. Examples of suitable colloids that are polymerizable with the water insoluble monomers include sorbitol acrylate, sorbitol methacrylate, cellulose acrylamide adduct, hydroxyethylcellulose acrylate, hydroxyethylcellulose methacrylate, methylcellulose acrylate, methylcellulose methacrylate, methylcellulose crotonate, and combinations thereof.

When a protective colloid is present in the emulsion, the emulsion preferably includes at least about 0.02% by weight, no greater than 65% by weight, no greater than 60% by weight no greater than 55% by weight, no greater than 50% by weight, no greater than 40% by weight, no greater than 30% by weight, from about 0.02% by weight to about 65% by weight, or even from about 0.02% by weight to about 20% by weight protective colloid based on solids in the emulsion.

2. Surfactant

Useful classes of surfactants include, e.g., nonionic, anionic, cationic and amphoteric surfactants, and combinations thereof. Suitable nonionic surfactants include, e.g., alkyl and alkylaryl polydiol ethers (e.g., ethoxylation products of lauryl, oleyl and stearyl alcohols), alkyl phenol glycol ethers (e.g., ethoxylation products of octyl or nonylphenol), and combinations thereof.

Suitable anionic surfactants include, e.g., alkylbenzenesulfonic acids, sulfonated fatty acids, sulfosuccinates, fatty alcohol sulfates, alkylphenol sulfates and fatty alcohol ether sulfates, and combinations thereof.

Suitable cationic surfactants include, e.g., quaternized amino alkoxylates, alkyl betaines, alkylamidobetaines, alkylamidosulfobetaines, and combinations thereof.

The surfactant optionally is polymerizable, i.e., it includes at least one ethylenically unsaturated functional group capable of reacting with other monomers or polymers. The surfactant optionally is polymerized with the water insoluble polymer of the emulsion, monomers from which the water insoluble polymer is prepared, or a combination thereof. A polymerizable surfactant that is polymerized with a water insoluble polymer is referred to herein as both a polymerizable surfactant and a polymerized surfactant.

The surfactant optionally is reactive, i.e., it includes functional groups that are capable of reacting with the solution polymer during cure. Examples of suitable surfactants include sulfate and sulfonate salts of nonyl phenol and alkyl alcohol ethoxylates, sodium vinyl sulfonate, sodium-1-allyloxy-2-hydroxy propane sulfonate, alkyl ethoxylate sulfates, alkyl phenol ethoxylate sulfates, alkyl ethoxylates, alkyl phenol ethoxylates, methoxy (meth)acrylates, ethoxy(meth)acrylates, and combinations thereof.

Examples of useful commercially available surfactants are available under the trade designations HITENOL BC-10, BC-1025, KH-10, KH-1025, and KH-20 from Dai-Ichi Kogyo Seiyaku Co., Ltd. (Kyoto, Japan).

When a surfactant is present in the emulsion, the emulsion preferably includes from about 0.05% by weight to about 10% by weight surfactant based on solids in the emulsion.

C. Optional Components

The emulsion optionally includes additional components including, e.g., water, additional polymers, epoxy-group containing compounds, additional surfactants, crosslinking agents, multifunctional ethylenically unsaturated monomers, antifoaming agents, colorants, dyes, preservatives, pH modifiers (e.g., sodium bicarbonate), rheology control agents, fungicides, bactericides, antimicrobials, plasticizers, fillers, adhesion promoters, water dispersible waxes, oils, fire retardant agents, antioxidants, latent acid catalysts, accelerating agents, and combinations thereof. The optional components can be added to the reaction mixture, the emulsion, or post-added to the binder composition.

The emulsion can include any amount of water including, e.g., from about 25% by weight to about 80% by weight, from about 30% by weight to about 70% by weight, or even from about 45% by weight to about 55% by weight water based on the total weight of the emulsion.

Suitable additional polymers include, e.g., additional water insoluble polymers, water soluble polymers, partially water soluble polymers, and combinations thereof. Examples of suitable additional polymers include the water insoluble polymers set forth above and the solution polymers set forth below. Examples of suitable additional polymers include starch, polyvinyl alcohol, cellulose, cellulose derivatives (e.g., hydroxymethyl cellulose, hydroxyethyl cellulose, hydroxypropyl cellulose, carboxymethyl cellulose, carboxyethyl cellulose, and combinations thereof), and combinations thereof.

Examples of suitable epoxy containing compounds include bisphenol-A/epichlorohydrin-based epoxy resins. Epoxy containing compounds can become part of the polymer backbone (e.g., as a result of grafting). Alternatively or in addition, epoxy containing compounds can be present in the emulsion or the aqueous binder composition as an epoxy resin additive capable of reacting with the carboxyl groups on the solution polymer. Examples of commercially available epoxy containing compounds are available under the EPON 828 trade designation from Shell Oil Company (Houston, Tex.) and DOW under the DER331 trade designation from The Dow Chemical Company (Midland, Mich.).

D. Polymerization Process

The emulsion preferably is prepared by emulsion polymerization and optionally can be prepared by free-radical bulk, suspension, and dispersion polymerization. Aqueous emulsion polymerization is also known as a free radical initiated chain polymerization in which a monomer, or a mixture of monomers, is polymerized in the presence of at least one of a surfactant and protective colloid. Other components are optionally present during the emulsion polymerization process including, e.g., chain transfer agent, free radical initiator, anti-foaming agent, coalescent, wetting agent, reducer, buffer, and freeze thaw additive.

The emulsion polymer can be prepared using any suitable polymerization process including continuous and discontinuous processes. In one useful process, the free radical initiator is added to the stabilizer solution in water and the monomer(s) are added slowly with mixing to a closed reactor system equipped with heating, cooling, and reflux capabilities, a condenser and feed lines. The monomer(s) are typically added to the reactor over a period from 2 hours to 5 hours, optionally with an initiator feed. When the monomer(s) feed is complete, the batch is treated with additional initiator and optionally reducer to complete monomer conversion to polymer. The batch is then cooled and filtered. Examples of useful emulsion polymerization processes are described in E.P. 2121834, which is incorporated herein.

1. Initiator

The polymerization is preferably conducted in the presence of a free radical initiator. Suitable classes of free radical initiators include oxidizing agents, examples of which include peroxides, hydroperoxides, peroxodisulfates, percarbonates, peroxo esters, hydrogen peroxide and azo compounds. Examples of suitable free radical initiators include hydrogen peroxide, dibenzoyl peroxide, dicyclohexyl peroxodicarbonate, dibenzoyl peroxodicarbonate, dilauroyl peroxide, methyl ethyl ketone peroxide, di-tert-butyl peroxide, acetylacetone peroxide, tert-butyl hydroperoxide, cumene hydroperoxide, tert-butyl perneodecanoate, t-butyl pivalate, tert-amyl perpivalate, tert-butyl perpivalate, tert-butyl perneohexanoate, tert-butyl per-2-ethylhexanoate, tert-butyl perbenzoate, peroxodisulfates of lithium, sodium, potassium and ammonium, azodiisobutyronitrile, 2,2'-azobis(2-amidinopropane)dihydrochloride, 2-(carbamoylazo)isobutyronitrile, 4,4-azobis(4-cyanovaleric acid), and combinations thereof.

The free radical initiator alternatively is part of an initiator system that includes an oxidizing agent (as discussed above) and a reducing agent. Suitable reducing agents include, e.g., sodium formaldehyde-sulfoxylate, ferrous salts, sodium dithionite, sodium hydrogen sulfite, sodium sulfite, sodium thiosulfate, sodium bisulphite, ascorbic acid, erythorbic acid and the sodium salts of ascorbic acid and erythorbic acid, and combinations thereof. The initiator system optionally includes a transition metal catalyst including, e.g., salts of iron, cobalt, nickel, copper, vanadium and manganese. Examples of suitable catalysts include iron (II) sulfate, cobalt (II) chloride, nickel (II) sulfate, copper (1) chloride, and combinations thereof.

The initiators can be employed alone or in a mixture with one another, one useful mixture includes hydrogen peroxide and sodium peroxodisulfate. For polymerization in an aqueous medium it is preferred to employ water-soluble initiators.

Preferably the emulsion reaction mixture includes from 0.05% by weight to 15% by weight, or even from 0.2% by weight to 8% by weight free radical initiator based on the monomers employed in the polymerization.

The free radical initiator can be added to the polymer emulsion as a solid or can be dissolved in a solvent and added as a solution. Addition of the free radical initiator in solution can aid in mixing and can provide a more even distribution of the free radical initiator in the polymer emulsion. The free radical initiator can be added to the polymer emulsion during a single addition step or can be added to the polymer emulsion more than once, providing a step wise addition. Step wise addition is useful where the polymer emulsion includes at least two different free radical initiators.

The amount of the free radical initiator in a polymer emulsion preferably is no greater than 10% by weight, no greater than 5% by weight, from about 0.05% by weight to about 1.5% by weight, from about 0.1% by weight to about 1% by weight, from about 0.15% by weight to about 0.75% by weight, or even from about 0.5% by weight to about 0.7% by weight based on the weight of the monomer(s) in the polymer emulsion.

2. Chain Transfer Agent

The composition used to form the polymer emulsion optionally includes a chain transfer agent. Suitable chain transfer agents include, e.g., sodium hypophosphite, thioglycolic acid, mercaptans including, e.g., primary octyl mercaptan, 2-mercaptoethanol, n-dodecylmercaptan, n-octylmercaptan, t-dodecyl mercaptan, iso-octyl thioglycolurate, mercapto carboxylic acids having from 2 to 8 carbon atoms, and their esters, examples of which include 3-mercapto propionic acid and 2-mercapto propionic acid, halogenated hydrocarbons including, e.g., carbonbromo compounds (e.g., carbon tetrabromide and bromotrichloromethane), and combinations thereof. The chain transfer agent can be present in the composition used to form the polymer emulsion in an amount of no greater than 5% by weight, from about 1% by weight to about 4% by weight, or even from about 1% by weight to about 3% by weight based on the monomer weight.

II. Solution

A. Carboxy Functional Polymer

The solution includes a solution polymer (which is also referred to herein as a carboxy functional polymer) that includes carboxyl groups. The solution polymer optionally functions as a lubricant for the emulsion. Useful carboxy functional polymers preferably are water soluble and are derived from water soluble monomers and optionally from monomers that are partially water soluble, water dispersible, water insoluble and combinations thereof. The carboxy functional polymer preferably has a glass transition temperature of at least 30° C., at least 50° C., at least 80° C., at least 100° C. or even at least 110° C., and a number average molecular weight (Mn) from about 1,000 g/mole to 10,000,000 g/mole, less than 250,000 g/mole, less than about 15,000 g/mole, less than about 10,000 g/mole, less than about 7,000 g/mole, less than about 5,000 g/mole, or even from about 5000 g/mole to about 10,000 g/mole.

Examples of useful carboxy functional polymers include α,β-ethylenically unsaturated mono- and dicarboxylic acid in polymerized or copolymerized form including polyacrylic acid, polymethacrylic acid, (meth)acrylic acid-hydroxyalkyl acrylate copolymers (e.g., acrylic acid-hydroxyethyl acrylate copolymer, methacrylic acid-hydroxyethyl acrylate copolymer, methacrylic acid hydroxymethyl acrylate, and acrylic acid hydroxymethyl acrylate), acrylic acid maleic acid copolymers, acrylic acid maleic acid hydroxyethylacrylate copolymers, and combinations thereof.

The aqueous binder composition preferably includes no greater than about 80% by weight, at least about 5% by weight, at least about 10% by weight, at least about 15% by weight, from about 20% by weight to about 70% by weight, or even from about 30% by weight to about 60% by weight carboxy functional polymer based on the weight of solids in the aqueous binder composition.

B. Polymerization Process

The carboxy functional polymer is preferably prepared by solution polymerization in which ethylenically unsaturated carboxylic acid or anhydride monomers, or a mixture of monomers, is polymerized in the presence of a free radical initiator, and optionally at least one of a chain transfer agent and an α,β-ethylenically unsaturated hydroxy monomer.

1. Ethylenically Unsaturated Carboxylic Acid Monomer

Examples of suitable ethylenically unsaturated carboxylic acid monomers include, e.g., acrylic acid, glacial acrylic acid, methacrylic acid, isooctyl acrylic acid, crotonic acid, isocrotonic acid, fumaric acid, cinnamic acid, maleic acid, 2-methylmaleic acid, itaconic acid, 2-methylitaconic acid, α,β-methyleneglutaric acid, methacrylic anhydride, isooctyl acrylic anhydride, crotonic anhydride, fumaric anhydride, maleic anhydride, and combinations thereof. The carboxy functional polymer can be prepared from 100% by weight, no greater than 98% by weight, no greater than about 90% by weight, no greater than about 80% by weight, no greater than about 75% by weight, at least 30% by weight, at least about 40% by weight, at least about 50% by weight, at least about 60% by weight, or even at least about 65% by weight ethylenically unsaturated carboxylic acid monomer based on the weight of the polymer.

2. Free Radical Initiator

Suitable free radical initiators include oxidizing agents including, e.g., water-soluble peroxy compounds such as hydrogen peroxide, t-butyl-hydroperoxide, di-t-butyl peroxide, cumene hydroperoxide, acetylacetone peroxide, t-butyl perneodecanoate, t-butyl perneohexanoate, t-butyl per-2-ethylhexanoate, t-butyl perbenzoate, t-butyl perpivalate, t-butyl pivalate, t-amyl perpivalate, di-t-butyl peroxide, dibenzoyl peroxide, dicyclohexyl peroxodicarbonate, dibenzoyl peroxodicarbonate, dilauroyl peroxide, methyl ethyl ketone peroxide; water-soluble inorganic persulphates including, e.g., ammonia persulfate, lithium persulfate, potassium persulfate and sodium persulfate; water-soluble azo compounds including, e.g., 4,4'-azobis(4-cyanovaleric acid) and its salts, azodiisobutyronitrile, 2,2'-azobis(2-amidinopropane)dihydrochloride, and 2-(carbamoylazo)isobutyonitrile, and combinations thereof.

The free radical initiator preferably is present in the reaction mixture used to form the carboxy functional polymer in an amount no greater than about 10% by weight, no greater than about 5% by weight, or even no greater than about 2% by weight based on the weight of monomer charged to the reaction vessel.

The free radical initiator optionally is part of an initiator system that includes oxidizing agent and reducing agent. Suitable reducing agents include, e.g., sodium formaldehydesulfoxylate, ferrous salts, sodium dithionite, sodium hydrogen sulfite, sodium sulfite, sodium thiosulfate, sodium bisulphate, ascorbic acid, erythorbic acid and the sodium salts of ascorbic acid and erythorbic acid, sodium salts of organic sulfinic acid derivatives (e.g., BRUGGOLITE FF6 M reducing agent (Bruggemann Chemical, Heilbronn, Germany), and combinations thereof.

The initiator system optionally includes a transition metal catalyst including, e.g., salts of iron, cobalt, nickel, copper, vanadium and manganese. Examples of suitable catalysts include iron (II) sulfate, cobalt (II) chloride, nickel (II) sulfate, copper (1) chloride, copper sulfate, and combinations thereof.

The amount of the initiator system (i.e. including the oxidizing agent and, where present, reducing agent and catalyst) is from 0.01% by weight to about 10% by weight, no greater than about 5% by weight, or even no greater than about 2% by weight based on the weight of monomer charged to the reaction vessel.

3. $\alpha,\beta$-Ethylenically Unsaturated Hydroxy Functional Monomer

The carboxy functional polymer is optionally additionally prepared from $\alpha,\beta$-ethylenically unsaturated hydroxy functional monomers. Useful $\alpha,\beta$-ethylenically unsaturated hydroxy functional monomers include, e.g., $\alpha,\beta$-ethylenically unsaturated monohydroxy functional monomers hydroxy alkyl acrylate monomers including, e.g., hydroxymethyl acrylate, hydroxyethyl acrylate, 2-hydroxyethyl acrylate, hydroxypropyl acrylate, and hydroxybutyl acrylate, hydroxy alkyl methacrylates including, e.g., hydroxymethyl methacrylate hydroxyethyl methacrylate, and hydroxypropyl methacrylate, and combinations thereof), and combinations thereof.

The carboxy functional polymer can be prepared from $\alpha,\beta$-ethylenically unsaturated hydroxy functional monomers in an amount of 0% by weight, at least 5% by weight, at least about 10% by weight, at least about 20% by weight, at least about 25% by weight, no greater than about 75% by weight, no greater than about 50% by weight, or even no greater than about 45% by weight based on the weight of solids in the solution polymer.

4. Additional Components a. Additional Water Insoluble Monomers

The carboxy functional polymer is optionally additionally prepared from water insoluble monomers (e.g., methyl methacrylate, styrene, and combinations thereof), other monomers (e.g., vinyl acetate, butyl acrylate, 2-ethyl hexyl acrylate, and combinations thereof), and combinations thereof.

The carboxy functional polymer is optionally prepared from water insoluble monomer in an amount of from 0% by weight to no greater than 35%, no greater than 25% by weight, or even no greater 10% by weight based on the weight of solids in the solution polymer.

b. Chain Transfer Agent

A chain transfer agent optionally is present in the reaction mixture used to form the carboxy functional polymer. Suitable chain transfer agents include, e.g., sodium hypophosphite, hypophosphorous acid, thioglycolic acid, mercaptans including, e.g., primary octyl mercaptan, 2-mercaptoethanol, n-dodecylmercaptan, n-octylmercaptan, t-dodecyl mercaptan, mercaptoethanol, iso-octyl thioglycolurate, mercapto carboxylic acids having 2 to 8 carbon atoms, and their esters, examples of which include 3-mercapto propionic acid and 2-mercapto propionic acid, halogenated hydrocarbons including, e.g., carbonbromo compounds (e.g., carbon tetrabromide and bromotrichloromethane), copper sulfate, C1-C4 aldehydes (e.g., formaldehyde, acetaldehdye, and propionaldehyde), hydroxylammonium salts (e.g., hydroxylammonium sulfate), formic acid, sodium bisulfite, isopropanol, methanol, ethanol, and combinations thereof. When present, the amount of chain transfer agent used to form the carboxy functional polymer is no greater than 10% by weight, from 1% by weight to about 6% by weight, or even from 1% by weight to about 3% by weight based on the weight of the monomers in the reaction mixture.

III. Optional Components in the Aqueous Binder Composition

A. Condensation Accelerator

The aqueous binder composition optionally includes a condensation accelerator that speeds the condensation reaction (e.g., crosslinking and thermosetting) that occurs as the composition cures. Suitable condensation accelerators include, e.g., phosphorous-based catalysts including, e.g., hypophosphorous acid (e.g., sodium hypophosphite and potassium hypophosphite) and phosphoric acid, para toluene sulfonic acid, any strong acids (e.g., hydrochloric acid, sulfuric acid, nitric acid, nitrous acid, perchloric acid, chloric acid, and trichloroacetic acid), and all of the corresponding ammonium salts of the aforementioned acids ammonium chloride, diammonium phosphate, ammonium nitrate, ammonium perchlorate, ammonium chlorate, ammonium bromide, ammonium iodide and ammonium sulfate), and acidic metal salts (e.g., aluminum chloride, iron chloride, zirconium oxychloride, chromic nitrate, chromic perchlorate, aluminum nitrate, iron nitrate, and zinc nitrate), and combinations thereof.

The condensation accelerator can be present in the aqueous binder composition in an amount of from 0% by weight to no greater than about 20% by weight, or even from about 3% by weight to about 6% by weight based on the weight of solids.

B. pH Neutralizing Agent

The binder composition optionally includes a pH neutralizing agent (i.e., an agent that neutralizes pH). The pH neutralizing agent can be added to the polyacid monomer (as indicated above), the hydroxyl functional, carboxy functional polymer, the reaction mixture used to form the hydroxyl functional, carboxy functional polymer, the binder composition, and combinations thereof. The pH neutralizing agent neutralizes or at least partially neutralizes the carboxy functional polymer, the reaction mixture used to form the carboxy functional polymer, the binder composition, the optional polyacid monomer (when present) or a combination thereof, to a pH of no greater than 7, no greater than about 6, no greater than about 5, at least 2, at least 2.5, from about 2 to about 6, from about 3 to about 5, or even about 4.

Useful pH neutralizing agents include bases, preferably non-volatile bases, including, e.g., amines (e.g., alkylamines including, e.g., ethylene diamine, triethyleamine, and diethylene triamine, morpholine, 2-amino-2-methyl-1-propanol, and alkanolamines (e.g., mono-, di- and triethanolamines including e.g., monoethanolamine), cyclic amines pyrrolidine, piperidine, piperazine and morpholine), ammonia, ammonium hydroxides (e.g., t-butylammonium hydroxide), alkali metal hydroxides sodium hydroxide and potassium hydroxide), metal carbonates (e.g., sodium carbonate), and combinations thereof.

C. Polyfunctional Components

The aqueous binder composition optionally includes a polyfunctional component including, e.g., polyacid components, polyfunctional components capable of reacting with the carboxyl group of the solution polymer, and combinations thereof.

Useful polyacid components include those polyacid components that are compatible with an aqueous composition. Suitable polyacid components include, e.g., diacids (e.g., maleic acid, maleic anhydride, fumaric acid, succinic acid, succinic anhydride, citric acid, adipic acid, glutaric acid, tartaric acid, itaconic acid, glutaconic acid, muconic acid, traumatic acid, and trimellitic acid), triacids (e.g., hemimellitic acid, trimesic acid, tricarballylic acid), higher order polyacids including, e.g., 1,2,3,4-butanetetracarboxylic acid, pyromellitic acid, carboxylic acid oligomers, acrylic acid-vinyl acetate compounds, and combinations thereof.

The polyacid component can be in the form of a partially neutralized polyacid component or a polyacid component that is not neutralized. The polyacid component can be neutralized with any of a variety of pH neutralizing agents including bases including, e.g., amines (e.g., alkylamines including, e.g., ethylene diamine, triethyleamine, and diethylene triamine, morpholine, 2-amino-2-methyl-1-propanol, and alkanolamines (e.g., monoalkanolamines including e.g., monoethanolamine)), ammonium hydroxides (e.g., t-butylammonium hydroxide), metal hydroxides (e.g., sodium hydroxide and potassium hydroxide), metal carbonates (e.g., sodium carbonate), and combinations thereof. The polyacid component can be neutralized to a pH of no greater than 6, no greater than 5, at least 2, at least 2.5, from about 2 to about 6, from about 3 to about 5, or even about 4.

When present, the binder composition includes at least 1% by weight, at least 5% by weight, at least about 10% by weight, at least 15% by weight, at least 20% by weight, at least 25% by weight, no greater than about 65% by weight, no greater than 60% by weight, no greater than about 55% by weight, from about 20% by weight to about 65% by weight, or even from about 25% by weight to about 55% by weight of the polyacid component based on the weight of the solids in the composition.

Examples of polyfunctional component capable of reacting with the carboxyl group of the solution polymer include polyols, i.e., compounds having at least two hydroxyl groups. Useful polyols include, e.g., ethylene glycol, glycerol, pentaerythritol, trimethylol propane, sorbitol, sucrose, glucose, resorcinol, catechol, pyrogallol, glycollated ureas, 1,4-cyclohexane diol, alkanolamines (e.g., diethanolamine, triethanolamine, dipropanolamine, and di-isopropanolamine), reactive polyols including, e.g., β-hydroxyalkylamides bis-[N,N-di(.beta.-hydroxyethyl)]adipamide), and combinations thereof. The aqueous binder composition preferably includes from 0% by weight to 20% by weight polyol based on solids.

D. Other Components

The aqueous binder composition optionally includes a variety of additional components including, e.g., additional polymers, latent acid catalysts, water-miscible organic solvent, wax dispersions, adhesion promoting agents (e.g., silanes and boranes), fillers, biocides, anti-mycotics including, e.g., fungicides and mold inhibitors, plasticizers, antifoaming agents, colorants, pigments, antioxidants, odor masking agents, and combinations thereof.

Suitable additional polymers include, e.g., additional water soluble polymers, partially water soluble polymers, and combinations thereof. Examples of suitable additional polymers include the solution polymers set forth above, starch, cellulose derivatives (e.g., hydroxymethyl cellulose, hydroxyethyl cellulose, hydroxypropyl cellulose, carboxymethyl cellulose, carboxyethyl cellulose, and combinations thereof), polyvinyl alcohol, surfactant, and combinations thereof.

Examples of useful latent acid catalysts include ammonium salts, e.g., ammonium chloride, ammonium chlorate, ammonium bromide, ammonium iodide, ammonium fluoride, ammonium nitrate, ammonium perchlorate, ammonium para-toluene sulfonate, ammonium sulfate, ammonium methansulfonate, ammonium phenylsulfonate, and combinations thereof, triethylamine sulfate, and combinations thereof.

The binder composition can be prepared by mixing the various components including, e.g., the emulsion polymer, the carboxy functional polymer, and any optional components including, e.g., the optional polyacid monomer, the optional polyfunctional component, the condensation accelerator, the latent acid catalyst, and the pH neutralizing agent using any suitable mixing technique.

IV. Use

The binder composition can be applied to a variety of substrates and then crosslinked via a condensation reaction, e.g., through the application of energy (e.g., heating) and evaporation of water, to form the condensed (i.e., crosslinked), dried polymer. Preferably the binder composition is heated in an oven at a temperature and for a period sufficient to condense the polymer, or even from about 130° C. to about 270° C. for from less than a minute to about 30 minutes, from about 1 minute to about 20 minutes, or even no greater than 10 minutes. The drying and curing functions can be carried out in a single step or in at least two steps. One useful method, which is known as B-staging, includes heating the composition at a temperature and for a time sufficient to substantially dry but not substantially cure the composition, and then, at a later point in time, heating the composition for a second period to effect curing.

The binder composition is particularly useful as a binder composition in fiberglass insulation and in methods of making fiberglass insulation. The glass fibers of the nonwoven web of the insulation are preferably maintained in fixed relation to each other through the dried composition. During the method of making fiberglass insulation, when the fibers are initially contacted with the binder composition, the binder composition can rapidly exhibit good wet strength before significant crosslinking begins, which helps to maintain the fibers in a spaced relation to one another such that the resulting web exhibits good initial loft, or even high loft. The fiberglass insulation includes dried binder composition in an amount of from about 1% by weight to about 20% by weight dried based on the weight of the glass fibers, or even from about 3% by weight to about 10% by weight based on the weight of the glass fibers. The binder composition is useful in forming fiberglass insulation having a variety of insulation values including, e.g., from about R8 (where R is the resistance to flow) to about R38, good spring back, recovery and humidity resistance.

The binder composition is also useful as a binder for a variety of substrates including, e.g., fibers (e.g., polymeric fibers including, e.g., polyolefin (e.g., polyethylene and polypropylene), polyester, polyacrylonitrile, polyvinyl acetate, polyvinyl chloride, polyamide, polyacrylamide, rayon, cellulose (e.g., wood and cotton), glass, and combinations thereof), particulate matter (e.g., particles, powders, and granules) of various materials including, e.g., silica, sand, cement, potash, stone, granite, marble, glass (e.g., microspheres, microparticles, particles, microtubes, and combinations thereof), and combinations thereof.

The fibers can be in a variety of forms including, e.g., individual fibers, nonwoven and woven fibrous webs, sheets, lofty fibrous products, filaments, strands, ropes, rolls, batts, reinforcing mats for roofing applications, mats for flooring applications, reinforcement scrims, and combinations thereof.

The binder composition is useful for forming composites including, e.g., composites that include inorganic fillers (e.g., sand, silica, cement, potash, stone, granite, marble, glass (e.g., microspheres, microparticles, particles, microtubes, and combinations thereof)), cellulose (e.g., wood composites), and combinations thereof, which can be used in a variety of applications including, e.g., countertops, sinks, toilet constructions (e.g., basins and tanks), pavers (e.g., bricks), doors, door cores, planks, boards, and combinations thereof. The binder composition can be used in a composite forming process that includes applying heat and pressure.

The binder composition can be applied using a variety of application techniques including, e.g., spraying, soaking, immersing, saturating, coating, e.g., roll coating, curtain coating, brush coating, beater deposition, and combinations thereof.

The webs formed from fibers treated with the binder composition and webs that include the binder composition can be used in a variety of applications including, e.g., insulation, reinforcing mats for applications including, e.g., roofing and flooring, substrates for printed circuit boards, battery separators, filters, tape, duct liners, duct board, and reinforcement scrims.

The invention will now be described by way of the following examples. All parts, ratios, percents, and amounts stated in the Examples are by weight unless otherwise specified.

EXAMPLES

Test Procedures

Test procedures used in the examples include the following. All ratios and percentages are by weight unless otherwise indicated.

Method of Measuring Glass Transition Temperature (Tg)

The glass transition temperature (Tg) is determined on a film of the sample. A film of the sample was obtained by drying the aqueous composition at 130C to form a dry film, and then allowing the film to cool to room temperature. The cooled dry film is then run on a differential scanning calorimetry (DSC) instrument. The (DSC) temperature program consists of conditioning at 140° C., quench cooling to −60° C., and then heating to 140° C. at 20° C. per minute. The DSC plot will briefly incline up before settling back above the glass transition temperature of the sample. The onset temperature is the temperature at the start of the appearance of the incline. The onset temperature is reported as the Tg.

Hardness Test Method

An aqueous composition is applied to a glass plate in an amount and in a manner sufficient to form a 10 mil wet film. The film is cured at 190° C. for 30 minutes. The cured film is cooled and then placed in distilled water overnight. The film is then checked the next day and rated on a scale of 1-10 where 10 is the greatest hardness. The value is recorded as a hardness value.

A rating of 1-3 means the film is soft and has partially or completely separated from the glass plate.

A rating of 4-5 means the film is adhered to the glass plate but is easily scraped off the glass plate with a razor blade. The scraped off film is flexible.

A rating of 6-7 means the film is adhered to the glass plate and, with some effort, can be scraped off the glass plate using a razor blade. The scraped off film is somewhat flexible.

A rating of 8-10 means the film is adhered to the glass plate, is very hard, and is very difficult to scrape off the glass plate with a razor blade. The scraped off film is hard.

Viscosity Test Method

Viscosity is determined using Brookfield viscometer model RVT at 20 rotations per minute. An appropriate spindle is chosen to obtain an accurate reading based on the anticipated viscosity of the composition and the manufacturer's recommendations. The sample composition is maintained at 25° C. and the measurement is taken within 1 hour of making the composition. The results are reported in centipoise (cps).

% Solids Determination

The percent solids in an aqueous composition are determined by weighing 1 gram (g) of the aqueous composition in a tared aluminum weighing pan and drying the composition for 2 hours at 130° C. The pan is then allowed to cool for 5 minutes and then the pan and contents are weighed (wf). The % solids is calculated according to the following equation: % solids=(wf/wi)*100.

Solution Polymer 1

An aqueous solution polymer of glacial acrylic acid, maleic acid and 2-hydroxyethyl acrylate was prepared by charging 35.52 grams of a 40% solution of maleic acid, 2.10 g copper sulfate, 0.01 g ferrous sulfate, 92 g 50% hydrogen peroxide, and 5 g 2-mercaptoethanol to a reaction vessel. The mixture was heated to 70° C. Over the next four hours a monomer feed of 514.28 g glacial acrylic acid, 250.79 g 2-hydroxyethyl acrylate, and 15.2 g methylmethacrylate was fed into the reaction vessel, and two mixtures were simultaneously fed to the reaction vessel: a mixture of 90.62 g water and 22.65 g 50% hydrogen peroxide, and a mixture of 102.43 g water and 10.05 g sodium erythorbate during the reaction the reaction temperature was maintained at from 88° C. to 94° C. The reaction mixture was then held for 30 minutes at from 88° C. to 94° C. A mixture of 18.58 g water and 4.01 g 50% hydrogen peroxide and a mixture of 21.16 g water and 1.44 g sodium erythorbate was then added to the reaction vessel over a period of 45 minutes. The mixture was then cooled to below 40° C. during which time 16.5 g monoethanolamine was slowly added to the mixture, followed by the addition of 32.25 g 50% caustic soda. When the mixture was below 40° C. and 1.5 g KATHON LX 1.5% biocide was added.

The resulting partially neutralized solution polymer had a pH of 3.6, a viscosity of 190 centipoise, and a percent solids of 40. The solution polymer had pendent carboxylic acid groups and pendent hydroxyl groups and a Tg of 72° C.

Solution Polymer 2

Solution polymer 2 was prepared according to the process described above with respect to Solution Polymer 1 with the exception that hydroxyethyl acrylate was replaced with acrylic acid from the reaction mixture (such that the amount of acrylic acid was 765.07), the sodium erythorbate was replaced with BRUGGOLITE FF6M reducer, and neither monoethanolamine nor caustic soda, nor KATHON LX biocide were added to the mixture. The resulting partially neutralized solution polymer had a pH of 2.0, a viscosity of 130 centipoise, a percent solids of 40, and a Tg of 91° C.

Emulsions 1-10

Emulsion 1: PD2210 starch stabilized polyvinyl acetate polymer emulsion having a Tg of 26° C., 60% solids, a pH of 5, and a viscosity of 3500 cps (H.B. Fuller Company, Vadnais Heights, Minn.).

The viscosity, pH and percent solids of the resulting binder compositions were measured or calculated for each composition and the results are set forth in Table 1.

The compositions were also tested for hardness and observed for color. The results are also set forth in Table 1.

TABLE 1

| Example | 1 | 2 | 3 | 4 | 5 | 6 | 7 | 8 | 9 | 10 |
|---|---|---|---|---|---|---|---|---|---|---|
| Emulsion 1 | 95.06 | 0 | 0 | 0 | 0 | 0 | 0 | 0 | 0 | 0 |
| Emulsion 2 | 0 | 104 | 0 | 0 | 0 | 0 | 0 | 0 | 0 | 0 |
| Emulsion 3 | 0 | 0 | 104 | 0 | 0 | 0 | 0 | 0 | 0 | 0 |
| Emulsion 4 | 0 | 0 | 0 | 104 | 0 | 0 | 0 | 0 | 0 | 0 |
| Emulsion 5 | 0 | 0 | 0 | 0 | 104 | 0 | 0 | 0 | 0 | 0 |
| Emulsion 6 | 0 | 0 | 0 | 0 | 0 | 121 | 0 | 0 | 0 | 0 |
| Emulsion 7 | 0 | 0 | 0 | 0 | 0 | 0 | 95 | 0 | 0 | 0 |
| Emulsion 8 | 0 | 0 | 0 | 0 | 0 | 0 | 0 | 81.5 | 0 | 0 |
| Emulsion 9 | 0 | 0 | 0 | 0 | 0 | 0 | 0 | 0 | 98.3 | 0 |
| Emulsion 10 | 0 | 0 | 0 | 0 | 0 | 0 | 0 | 0 | 0 | 104 |
| Solids ratio (E:S) | 60:40 | 60:40 | 60:40 | 60:40 | 60:40 | 60:40 | 60:40 | 60:40 | 60:40 | 59:41 |
| Water | 6 | 0 | 0 | 16 | 0 | 0 | 6 | 14 | 0 | 11 |
| Ammonium Chloride | 3.8 | 3.8 | 3.8 | 5 | 3.8 | 3.8 | 3.8 | 3.8 | 3.8 | 3.8 |
| Polymer Solution 1 | 95 | 95 | 97 | 98 | 95 | 95 | 95 | 95 | 95 | 102 |
| pH | 3.24 | 3.18 | 3.18 | 3.28 | 3.26 | 3.31 | 3.26 | 3.36 | 3.29 | 3.31 |
| Viscosity (cps) | 675 | 550 | 290 | 950 | 150 | 80 | 432 | 588 | 150 | 270 |
| % Solids | 47.16 | 47.19 | 46.75 | 43.68 | 46.88 | 42.6 | 47.16 | 47.98 | 46.69 | 44.77 |
| Color | dark | Light | light | dark | light | light | dark | dark | light | light |
| Hardness | 9 | 10 | 10 | 8 | 7 | 7 | 9 | 6 | 10 | 7 |

Emulsion 2: PD0330 vinyl acetate polymer emulsion stabilized with polyvinyl alcohol having a Tg of 40° C., 55% solids, a pH of 5, and a viscosity of 3000 cps (H.B. Fuller Company).

Emulsion 3: PN3133M vinyl acetate-silane copolymer emulsion stabilized with polyvinyl alcohol having a Tg of 40° C., 55% solids, a pH of 5, and a viscosity of 1800 cps (H.B. Fuller Company).

Emulsion 4: PD2227 starch stabilized vinyl acetate polymer emulsion having a Tg of 26° C., 55% solids, a pH of 5, and a viscosity of 11,000 cps (H.B. Fuller Company).

Emulsion 5: PD0128 vinylacrylic copolymer emulsion stabilized with surfactant and hydroxyethyl cellulose having a Tg of 16° C., 55%, a pH of 5, and a viscosity of 750 cps (H.B. Fuller Company).

Emulsion 6: PD1202 vinyl acetate polymer emulsion stabilized with surfactant and having a Tg of 35° C., 47% solids, a pH of 5, and a viscosity of 100 cps (H.B. Fuller Company).

Emulsion 7: PD0025 starch stabilized vinyl acetate polymer emulsion having a Tg of 33° C., 60% solids, pH of 5, and a viscosity of 1600 cps (H.B. Fuller Company).

Emulsion 8: PD0027 starch stabilized vinyl acetate polymer emulsion having a Tg of 33° C., 70% solids, a pH of 5, and a viscosity of 10,000 cps (H.B. Fuller Company).

Emulsion 9: PD0062 vinyl acetate polymer emulsion stabilized with hydroxyethyl cellulose having a Tg of 40° C., 58% solids, a pH of 5, and a viscosity of 1200 cps (H.B. Fuller Company).

Emulsion 10: PD2121 vinyl acrylic acid polymer emulsion stabilized with polyvinyl alcohol having a Tg of 8° C., 55% solids, a pH of 5, and a viscosity of 2500 cps (H.B. Fuller Company).

Examples 1-10

Aqueous binder compositions were prepared by combining, at room temperature and with mixing, the emulsions set forth above, water, 25% by weight ammonium chloride, and Solution Polymer 1 in the amounts set forth below in Table 1.

Emulsions 11-21

The following emulsions were used in the preparation of the binder compositions of Examples 11-21.

Emulsion 11: PD2210 starch stabilized vinyl acetate polymer emulsion having a Tg of 26° C., 60% solids, a pH of 5, and a viscosity of 3500 cps.

Emulsion 12: PD2210 starch stabilized vinyl acetate emulsion having a Tg of 26° C., 60% solids, a pH of 5, and a viscosity of 3500 cps.

Emulsion 13: PD2121 vinyl acetate polymer emulsion stabilized with polyvinyl alcohol having a Tg of 8° C., a solids of 55%, a pH of 5, and a viscosity of 2500 cps.

Emulsion 14: PN3133M vinyl acetate-silane copolymer emulsion stabilized with polyvinyl alcohol and having a Tg of 40° C., 55% solids, a pH of 5, and a viscosity of 1800 cps.

Emulsion 15: PD0330 vinyl acetate polymer emulsion stabilized with polyvinyl alcohol having a Tg of 40° C. 55% solids, a pH of 5, and a viscosity of 3000 cps.

Emulsion 16: PN3741H vinyl acetate-glycidyl methacrylate-acrylic acid polymer emulsion stabilized with a surfactant having a Tg of 29° C., 51% solids, a pH of 4.5, and a viscosity of 135 cps (H.B. Fuller Company).

Emulsion 17: PD0458NW modified vinyl acetate-acrylic acid copolymer emulsion stabilized with polyvinyl alcohol having a Tg of 38° C., 58% solids, a pH of 5 pH, and a viscosity of 1500 cps (H.B. Fuller Company).

Emulsion 18: PN3178Z polyvinyl acetate-diallyl maleate copolymer stabilized with polyvinyl alcohol having a Tg of 40° C., 53.5% solids, a pH of 5, and a viscosity of 1750 cps (H.B. Fuller Company).

Emulsion 19: VINNAPAS 440H vinylacetate-ethylene copolymer emulsion stabilized with polyvinyl alcohol having a Tg of 0° C., 55% solids, a pH of 5, and a viscosity of 4000 cps (Wacker Polymers, Allentown, Pa.).

Emulsion 20: PD2227 starch stabilized polyvinyl acetate polymer emulsion having a Tg of 20° C. 55% solids, a pH of 5, and a viscosity of 11,000 cps.

Emulsion 21: PD0330 vinyl acetate polymer emulsion stabilized with polyvinyl alcohol having a Tg of 40° C., 55% solids, a pH of 5, and a viscosity of 3000 cps.

Examples 11-21

Aqueous binder compositions were prepared by combining, at room temperature and with mixing, the emulsions set forth above, a 25% by weight solution of ammonium chloride, a 40% by weight solution of maleic acid, monoethanolamine, and Solution Polymer 1 in the amounts set forth below in Table 2. The viscosity, pH and percent solids of the resulting binder compositions were measured or calculated for each composition and the results are set forth in Table 2.

The compositions were also tested for hardness and observed for color. The results are also set forth in Table 2.

Emulsion 23: PD0062 polyvinyl acetate polymer emulsion stabilized with hydroxyethyl cellulose having a Tg of 40° C. 58% solids, a pH of 5, and a viscosity of 1200 cps (H.B. Fuller Company).

Emulsion 24: PN3610K SA styrene acrylic acid polymer emulsion stabilized with surfactant having a Tg of 26° C., 45% solids, a pH of 2.8, and a viscosity of 105 cps (H.B. Fuller Company).

Emulsion 25: PD2222 SA styrene acrylic acid-silane polymer emulsion stabilized with surfactant having a Tg of 30° C. 45% solids, a pH of 8.75, and a viscosity of 225 cps (H.B. Fuller Company).

Examples 22-34

Aqueous binder compositions were prepared by combining, at room temperature and with mixing, the emulsions set

TABLE 2

| Example | 11 | 12 | 13 | 14 | 15 | 16 | 17 | 18 | 19 | 20 | 21 |
|---|---|---|---|---|---|---|---|---|---|---|---|
| Emulsion 11 | 144 | 0 | 0 | 0 | 0 | 0 | 0 | 0 | 0 | 0 | 0 |
| Emulsion 12 | 0 | 144 | 0 | 0 | 0 | 0 | 0 | 0 | 0 | 0 | 0 |
| Emulsion 13 | 0 | 0 | 157 | 0 | 0 | 0 | 0 | 0 | 0 | 0 | 0 |
| Emulsion 14 | 0 | 0 | 0 | 0 | 0 | 0 | 0 | 0 | 0 | 0 | 0 |
| Emulsion 15 | 0 | 0 | 0 | 0 | 0 | 0 | 0 | 0 | 0 | 0 | 0 |
| Emulsion 16 | 0 | 0 | 0 | 157 | 0 | 0 | 0 | 0 | 0 | 0 | 0 |
| Emulsion 17 | 0 | 0 | 0 | 0 | 157 | 0 | 0 | 0 | 0 | 0 | 0 |
| Emulsion 18 | 0 | 0 | 0 | 0 | 0 | 184 | 0 | 0 | 0 | 0 | 0 |
| Emulsion 19 | 0 | 0 | 0 | 0 | 0 | 0 | 146 | 0 | 0 | 0 | 0 |
| Emulsion 20 | 0 | 0 | 0 | 0 | 0 | 0 | 0 | 157 | 0 | 0 | 0 |
| Emulsion 21 | 0 | 0 | 0 | 0 | 0 | 0 | 0 | 0 | 157 | 0 | 0 |
| Emulsion 22 | 0 | 0 | 0 | 0 | 0 | 0 | 0 | 0 | 0 | 157 | 0 |
| Emulsion 23 | 0 | 0 | 0 | 0 | 0 | 0 | 0 | 0 | 0 | 0 | 157 |
| Solids ratio (E:S) | 60:40 | 60:40 | 60:40 | 60:40 | 60:40 | 60:40 | 59:41 | 60:40 | 60:40 | 60:40 | 60:40 |
| $NH_4Cl^1$ | 68 | 68 | 68 | 68 | 68 | 68 | 68 | 68 | 68 | 68 | 0 |
| Maleic Acid[2] | 8 | 8 | 8 | 8 | 8 | 0 | 8 | 8 | 8 | 8 | 0 |
| Monoethanolamine (g) | 29 | 29 | 29 | 29 | 29 | 18 | 29 | 29 | 29 | 29 | 20 |
| Polymer Solution 1 | 145 | 145 | 145 | 145 | 145 | 145 | 145 | 145 | 145 | 145 | 145 |
| pH | 5.9 | 6 | 5.74 | 5.77 | 6.06 | 4.84 | 5.62 | 5.82 | 5.9 | 5.87 | 5.22 |
| Viscosity (cps) | 350 | 384 | 1100 | 2650 | 4050 | 308 | 1050 | 1200 | 3920 | 900 | 3630 |
| % Solids | 48 | 48.58 | 46.24 | 46.71 | 47.54 | 41.86 | 47.44 | 46.48 | 46.74 | 45.53 | 44.7 |
| Hardness | 9 | 9 | 6 | 9 | 9 | 8 | 6 | 9 | 6 | 8 | 10 |
| Tg (° C.) | ND | ND | ND | ND | ND | ND | ND | 35 | ND | ND | ND |
| Tg (° C.) | ND | ND | ND | ND | ND | ND | ND | 84 | ND | ND | ND |

[1]25% by weight solution of ammonium chloride
[2]40% by weight solution of maleic acid
ND = Not Determined Emulsions 22-25

The following emulsions were used in the preparation of the binder compositions of Examples 22-34.

Emulsion 22: PD0330 A polyvinyl acetate polymer emulsion stabilized with polyvinyl alcohol having a Tg of 40° C., 55% solids, a pH of 5, and a viscosity of 3000 cps (H.B. Fuller Company).

forth above, a 25% by weight solution of ammonium chloride, monoethanolamine, and either Solution Polymer 1 or Solution Polymer 2 in the amounts set forth below in Table 3. The viscosity, pH and percent solids of the resulting binder compositions were determined for each composition and the results are set forth in Table 3.

The compositions were also tested for hardness and observed for color. The results are also set forth in Table 3.

TABLE 3

| Example | 22 | 23 | 24 | 25 | 26 | 27 | 28 | 29 | 30 | 31 | 32 | 33 | 34 |
|---|---|---|---|---|---|---|---|---|---|---|---|---|---|
| Emulsion 22 | 104 | 104 | 104 | 0 | 0 | 0 | 104 | 0 | 0 | 104 | 104 | 104 | 104 |
| Emulsion 23 | 0 | 0 | 0 | 98 | 98.3 | 98.3 | 0 | 0 | 0 | 0 | 0 | 0 | 0 |
| Emulsion 24 | 0 | 0 | 0 | 0 | 0 | 0 | 0 | 127 | 0 | 0 | 0 | 0 | 0 |
| Emulsion 25 | 0 | 0 | 0 | 0 | 0 | 0 | 0 | 0 | 127 | 0 | 0 | 0 | 0 |
| water | 0 | 0 | 0 | 0 | 0 | 0 | 0 | 0 | 0 | 0 | 0 | 0 | 0 |
| ammonium chloride | 0 | 0 | 3.8 | 0 | 0 | 3.8 | 3.8 | 3.8 | 3.8 | 0 | 0 | 0 | 3.8 |
| Solution Polymer 1 | 95 | 0 | 0 | 95 | 0 | 0 | 0 | 95 | 106 | 80 | 50 | 20 | 0 |
| Solution Polymer 2 | 0 | 95 | 95 | 0 | 95 | 95 | 95 | 0 | 0 | 0 | 0 | 0 | 49.8 |
| monoethanolamine | 0 | 0 | 0 | 0 | 0 | 0 | 6 | 0 | 0 | 0 | 0 | 0 | 0 |
| Solids ratio (E:S) | 60:40 | 60:40 | 60:40 | 60:40 | 60:40 | 60:40 | 60:40 | 60:40 | 57:43 | 64:36 | 74:26 | 88:12 | 74:26 |
| pH | 3.6 | 1.96 | 1.67 | 3.5 | 1.93 | 1.71 | 3.86 | ND | 3.7 | 3.5 | 3.46 | 3.43 | 1.74 |
| Viscosity (cps) | 764 | 1524 | 1180 | 210 | 256 | 220 | 2660 | ND | 426 | 875 | 1320 | 2750 | 1860 |

TABLE 3-continued

| Example | 22 | 23 | 24 | 25 | 26 | 27 | 28 | 29 | 30 | 31 | 32 | 33 | 34 |
|---|---|---|---|---|---|---|---|---|---|---|---|---|---|
| % Solids | 47.8 | 48.6 | 48.0 | 48.2 | 48.7 | 48.3 | 49.0 | ND | 40.2 | 48.5 | 50.4 | 53.6 | 50.0 |
| Color | light | sl dark | dark | light | light | sl dark | sl dark | light | light | light | light | light | sl dark |
| Hardness | 10 | 6 | 6 | 10 | 6 | 6 | 10 | 6 | 10 | 10 | 10 | 10 | 6 |
| Tg (° C.) | ND | ND | ND | ND | ND | 33 | ND | ND | 38 | ND | 32 | ND | ND |
| Tg (° C.) | ND | ND | ND | ND | ND | 95 | ND | ND | 91 | ND | 86 | ND | ND |

ND = Not Determined
Sl = slight
V = very

All references referred to herein are incorporated herein in their entirety.

Other embodiments are within the claims. Although the curable aqueous composition has been frequently referred to herein as a binder composition, the composition can be used for a variety of purposes and applications including, coating continuous and discontinuous coatings), layers, films, fibers, and filaments.

What is claimed is:

1. An aqueous binder composition comprising:
   at least about 15% by weight, based on solids, of a water soluble, carboxy functional, hydroxy functional solution polymer; and
   a component comprising
      a water insoluble polymer derived from vinyl acetate, the water insoluble polymer exhibiting a glass transition temperature of at least 10° C. and
      a stabilizer,
      at least one of the water insoluble polymer and the stabilizer comprising functional groups that react with the carboxyl groups of the solution polymer during crosslinking,
   the binder composition, when dry, exhibiting a first glass transition temperature of at least 10° C. and a second glass transition temperature of at least 50° C.

2. An aqueous binder composition comprising:
   at least about 15% by weight, based on solids, of a water soluble, carboxy functional, hydroxy functional solution polymer comprising carboxyl groups and hydroxyl groups; and
   a component comprising a water insoluble polymer that exhibits a glass transition temperature of at least 10° C., and a stabilizer, the water insoluble polymer being free of carboxylic acid groups,
   the binder composition, when dry, exhibiting a first glass transition temperature of at least 20° C. and a second glass transition temperature of at least 50° C.

3. The binder composition of claim 1, wherein the ratio of the weight of the water insoluble polymer and stabilizer to the weight of the solution polymer is from about 85:15 to about 20:80.

4. The binder composition of claim 1, wherein the ratio of the weight of the water insoluble polymer and stabilizer to the weight of the solution polymer is from about 85:15 to about 45:55.

5. The binder composition of claim 1, wherein the cured binder composition exhibits a hardness of at least 6.

6. The binder composition of claim 1, wherein the cured binder composition exhibits a hardness of at least 7.

7. The binder composition of claim 1, wherein the cured binder composition exhibits a hardness of at least 8.

8. The binder composition of claim 1, wherein the water insoluble polymer is derived from ethylenically unsaturated monomer.

9. The binder composition of claim 1, wherein the water insoluble polymer comprises at least one of polyvinyl acetate and vinyl acetate copolymer.

10. The binder composition of claim 1, wherein the stabilizer comprises starch.

11. The binder composition of claim 1, wherein the water insoluble polymer is derived from at least one of vinyl acetate, acrylate, styrene, olefin, and acrylamide.

12. The binder composition of claim 1, wherein the water insoluble polymer is an emulsion polymer.

13. The binder composition of claim 1, wherein the component is an emulsion.

14. The binder composition of claim 1, wherein the stabilizer comprises a protective colloid.

15. The binder composition of claim 1, wherein the stabilizer comprises at least one of starch, hydroxymethyl cellulose, carboxymethyl cellulose, hydroxyethyl cellulose, hydroxypropyl cellulose, polyvinyl alcohol, and surfactant.

16. The binder composition of claim 1, wherein the stabilizer comprises surfactant and the surfactant comprises functional groups that are reactive with the first polymer.

17. The binder composition of claim 1, wherein the water insoluble polymer comprises hydroxyl groups.

18. The binder composition of claim 1 further comprising at least one of a polyol, an alkanolamine, a silane, and a wax dispersion.

19. The binder composition of claim 1 further comprising a latent acid catalyst.

20. The binder composition of claim 1 further comprising a latent acid catalyst comprising ammonium nitrate.

21. An aqueous binder composition comprising:
   a solution comprising a first carboxy functional, hydroxy functional polymer comprising carboxyl groups and hydroxyl groups;
   at least about 15% by weight, based on solids, of the first polymer; and
   an emulsion comprising
      a second water insoluble polymer derived from vinyl acetate, the water insoluble polymer exhibiting a glass transition temperature of at least 10° C., and
      a stabilizer,
      at least one of the water insoluble polymer and the stabilizer comprising a functional group that is reactive with the carboxyl groups of the first polymer during crosslinking,
   the binder composition, when dry, exhibiting a first glass transition temperature of at least 10° C. and a second glass transition temperature of at least 50° C.

22. The binder composition of claim 2, wherein the first glass transition temperature is at least 25° C.

23. The binder composition of claim 1, wherein the first glass transition temperature is no greater than 60° C.

24. The binder composition of claim 1, wherein the first glass transition temperature is no greater than 55° C.

25. The binder composition of claim 1, wherein the first glass transition temperature is no greater than 40° C.

26. An aqueous binder composition comprising:
a carboxy functional, hydroxyl functional solution polymer; and
a component comprising
a water insoluble polymer derived from vinyl acetate, and
a stabilizer,
at least one of the water insoluble polymer and the stabilizer comprising functional groups that react with the carboxyl groups of the carboxy functional, hydroxyl functional solution polymer during crosslinking,
the binder composition, when dry, exhibiting a first glass transition temperature of at least 10° C. and a second glass transition temperature of at least 50° C.

27. An aqueous binder composition comprising:
a water soluble, carboxy functional, hydroxy functional solution polymer comprising carboxyl groups and hydroxyl groups; and
a component comprising
a water insoluble polymer derived from vinyl acetate and comprising hydroxyl groups, the water insoluble polymer exhibiting a glass transition temperature of at least 10° C., and
a stabilizer,
the binder composition, when dry, exhibiting a first glass transition temperature of at least 10° C. and a second glass transition temperature of at least 50° C.

28. An aqueous binder composition comprising:
a first polymer comprising carboxyl groups and hydroxyl groups;
a component comprising
a water insoluble polymer derived from vinyl acetate and exhibiting a glass transition temperature of at least 10° C., and
a stabilizer,
at least one of the water insoluble polymer and the stabilizer comprising functional groups that react with the carboxyl groups of the first polymer during crosslinking; and
a latent acid catalyst,
the binder composition, when dry, exhibiting a first glass transition temperature of at least 10° C. and a second glass transition temperature of at least 50° C.

29. The binder composition of claim 28, wherein the latent acid catalyst comprises ammonium nitrate.

30. The binder composition of claim 1, wherein the water insoluble polymer exhibits a glass transition temperature of at least 25° C.

31. A method of using the binder of claim 1, said method comprising contacting a substrate with the binder composition.

32. The method of claim 31, wherein the substrate comprises at least one of fibers and particles.

* * * * *